Oct. 11, 1932.   A. A. KNEE   1,882,502
FRAUD PREVENTING MEANS FOR COIN CONTROLLED MECHANISM
Filed April 1, 1929   8 Sheets-Sheet 1

Inventor:
A. A. KNEE
By
Attorney

Oct. 11, 1932.　　　　A. A. KNEE　　　　1,882,502
FRAUD PREVENTING MEANS FOR COIN CONTROLLED MECHANISM
Filed April 1, 1929　　　8 Sheets-Sheet 4
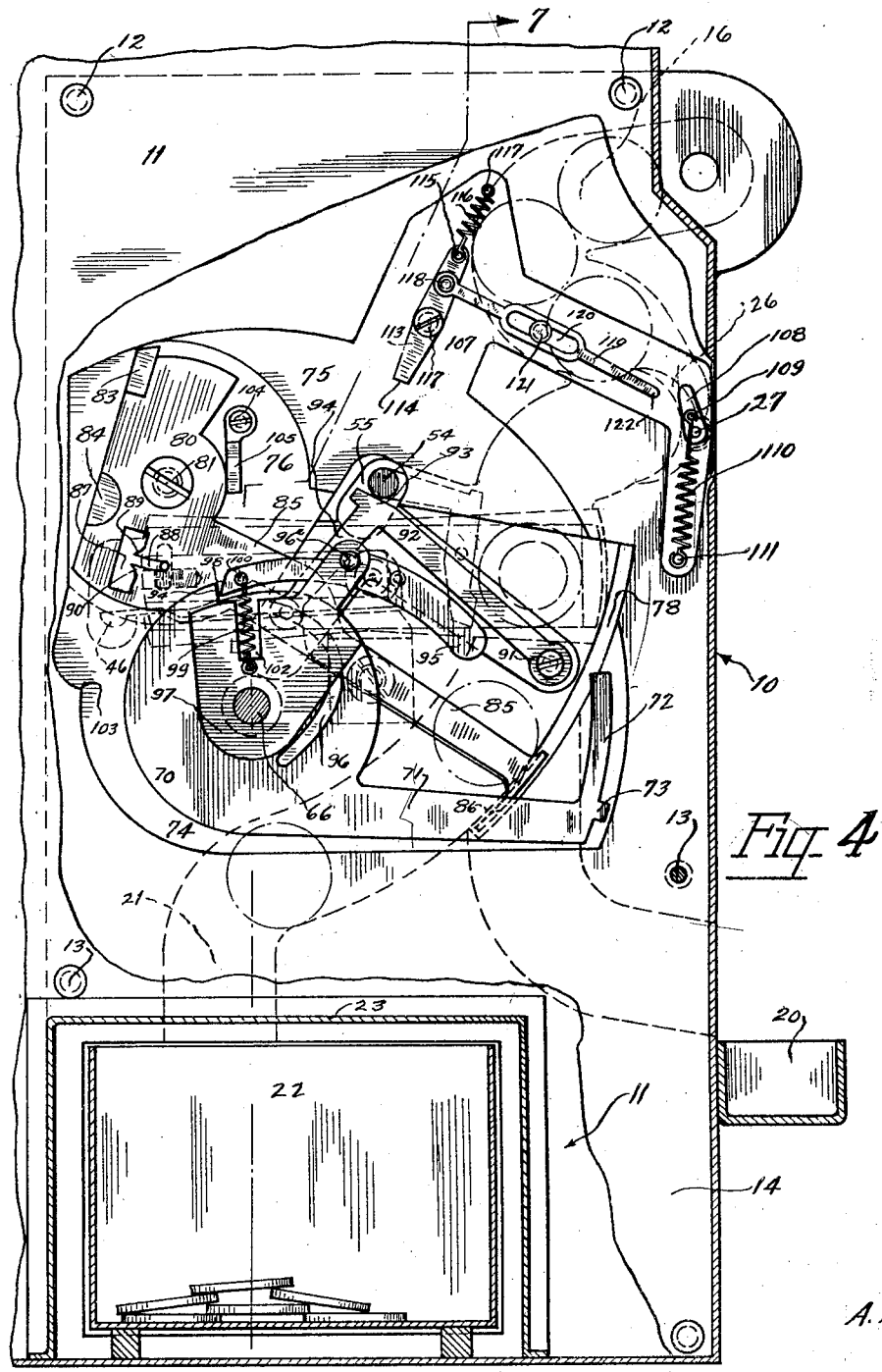
Fig. 4
Inventor:
A. A. KNEE
By 
Attorney Oct. 11, 1932.  A. A. KNEE  1,882,502
FRAUD PREVENTING MEANS FOR COIN CONTROLLED MECHANISM
Filed April 1, 1929  8 Sheets-Sheet 5
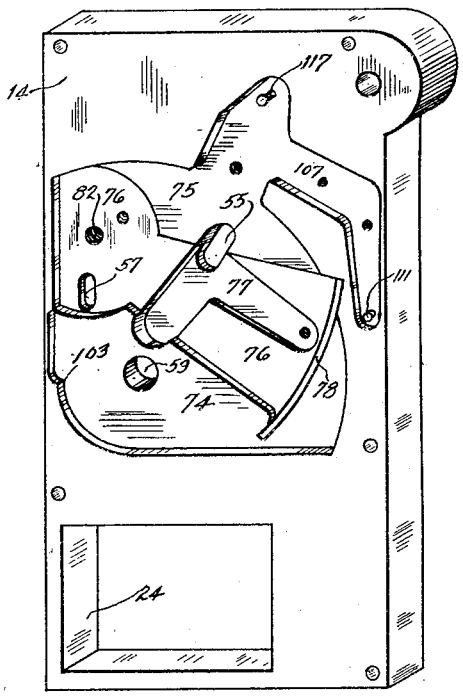
Fig. 6
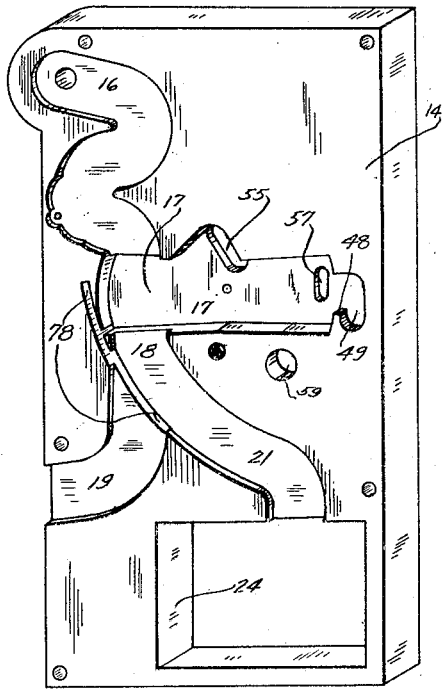
Fig. 5
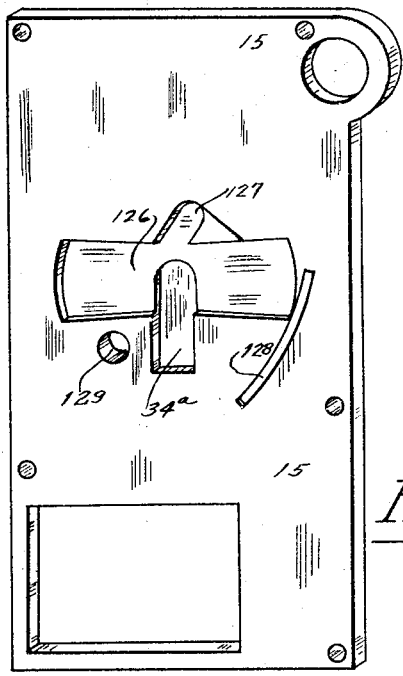
Fig. 20
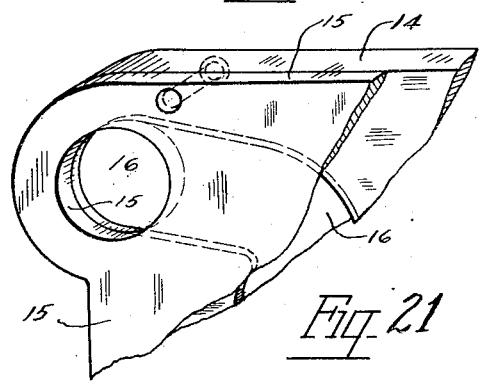
Fig. 21
Inventor:
A. A. KNEE
Attorney Oct. 11, 1932. A. A. KNEE 1,882,502
FRAUD PREVENTING MEANS FOR COIN CONTROLLED MECHANISM
Filed April 1, 1929 8 Sheets-Sheet 6
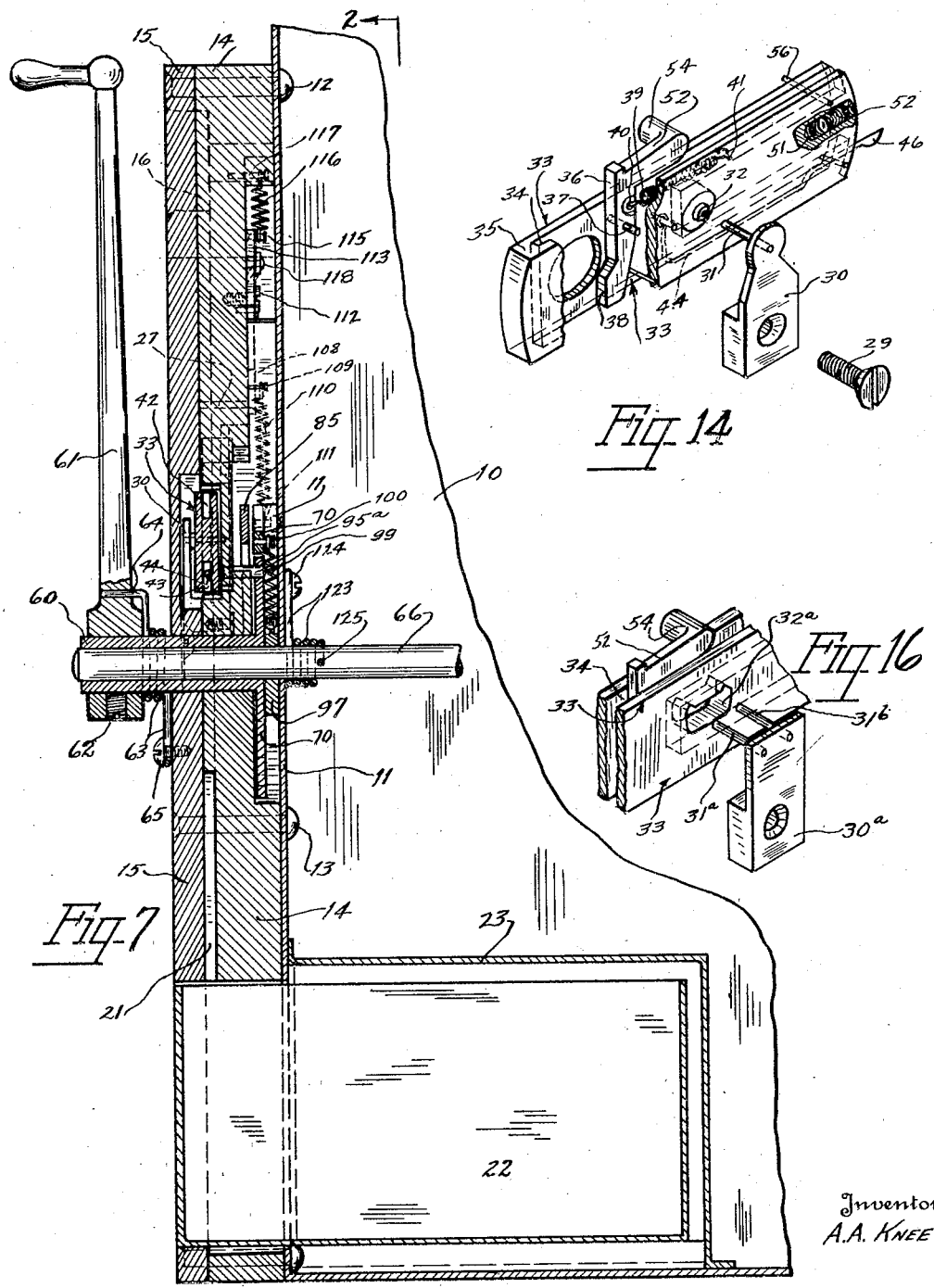
Inventor:
A. A. KNEE Oct. 11, 1932.   A. A. KNEE   1,882,502
FRAUD PREVENTING MEANS FOR COIN CONTROLLED MECHANISM
Filed April 1, 1929   8 Sheets-Sheet 7
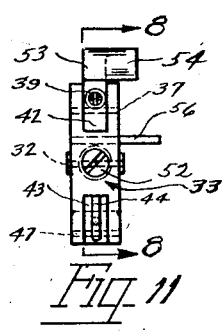
Inventor:
A.A. KNEE
By
Attorney Oct. 11, 1932. A. A. KNEE 1,882,502
FRAUD PREVENTING MEANS FOR COIN CONTROLLED MECHANISM
Filed April 1, 1929 8 Sheets-Sheet 8

Inventor:
A. A. Knee
By Paul B. Eaton
Attorney

Patented Oct. 11, 1932

1,882,502

UNITED STATES PATENT OFFICE

AARON A. KNEE, OF CHARLOTTE, NORTH CAROLINA, ASSIGNOR, BY DIRECT AND MESNE ASSIGNMENTS, TO VANAK CORPORATION, OF CHARLOTTE, NORTH CAROLINA, A CORPORATION OF NORTH CAROLINA

FRAUD PREVENTING MEANS FOR COIN CONTROLLED MECHANISM

Application filed April 1, 1929. Serial No. 351,566.

My invention relates to a fraud preventive device adapted to operate in coin controlled mechanisms, such as vending machines, which are adapted for vending merchandise, or in any coin controlled mechanism whereby the depositing of a coin of a predetermined or given value will deliver goods or render some sort of service for the money deposited.

An object of my invention is to provide a coin selector adapted to operate with coin controlled machines, wherein the selector will prevent any coin from entering the coin controlled machine unless the coins are genuine, and of a given value.

Another object of my invention is to provide a coin selector adapted to operate with coin controlled machines which selector is adapted to reject all coins unless the coins are of a given value and weight, and in good condition, and are not marred, defaced, or in other ways rendered unfit for circulation in ordinary trade.

I am aware that heretofore various efforts have been made to provide a fraud preventive device adapted to operate with coin controlled machine embodying many principles such as magnets for removing ferrous metals, and slugs, balancing devices for delivering the coin to the proper place, chutes for conducting the coin and causing the same to jump gaps and in other ways to sort out the ferrous coins, and to deliver to the vending mechanism only genuine coins.

So far as I am advised I believe I have provided the only mechanism of this type which has heretofore been known for eliminating ferrous coins from a coin controlled device by means of a perfectly balanced assorted mechanism, which is adapted to direct the coin into the proper channels to the vending mechanism if the coin is of proper weight, and is not marred or otherwise defaced. If the coin is not of a given weight or is a ferrous coin such as a washer, or a slug or other device, it will return the coin or slug to the depositor and will not deliver the same to the coin controlled mechanism for operating the machine, it being the principle of my invention that if a coin is too light or if the coin is too heavy, the same will be refused by the coin selector, and will not be delivered to the vending mechanism or the coin controlled mechanism, but will be returned to the depositor and the machine will not be operated.

Another object of my invention is to provide a fraud preventive device for use with coin controlled machine, said fraud preventive device comprising broadly, a balanced mechanism which is adapted to cause the selector to operate when the mechanism is properly balanced, and which is adapted to be properly balanced only when a genuine coin is placed in the balancing mechanism, and when a coin is too light or too heavy the balancing mechanism will not be properly balanced, and the coin will be rejected when it is attempted to operate the machine after depositing such defective coin, and in combination with this balancing mechanism I provide what I call stabilizing means which are adapted to operate only when the coin of proper weight, or the coin that is too heavy is deposited in the fraud preventive device, its operation being that when a coin of proper weight is dropped into the fraud preventive device the stabilizer will act to stabilize the balancing mechanism at the proper point, and will cause the mechanism to operate, and when a coin which is too heavy is dropped into the device it will raise the stabilizer bodily and cause it to operate to reject the coin which is too heavy.

In many fraud preventive devices heretofore used attempts have been made to use a balancing device, but in all of such devices there is a tendency for the balancing means to remain in a moving position for a certain length of time after the coin is deposited therein, but in my device I provide means to quickly bring the balancing mechanism to rest, so that the machine can be operated immediately after dropping the coin therein without endangering the mechanism of the machine, or without interfering with its proper action in returning or rejecting coins as the balancing mechanism, due to the association of the stabilizing means therewith, immediately brings the balancing mechanism to a position of rest, and therefore permits the machine to be operated immediately after the coin is dropped therein without any interval of time in which the operator must wait, it being apparent that in some of the devices heretofore attempted a dummy button is directed to be pushed by the operator, the only purpose of this dummy button being to allow time for the stabilizing means to become balanced and to assume a stationary position, but in my device by means of my stabilizing device I cause the balance mechanism to immediately assume a position of rest after the coin is dropped therein, so that the machine can be operated immediately after said coin has been deposited in the coin selecting mechanism.

In the drawings I have shown a shaft extending from the device, and it is desired to be stated that this shaft is capable of being a part of any coin controlled machine, as it is adapted to be connected by suitable connection to any coin controlled machine, and I have shown only the coin selecting mechanism which is adapted to be used in connection with any coin controlled machine, the main object of my selector being to deliver genuine coins to the coin controlled machine, and to reject any coins which are not genuine and return them to the operator of the machine.

Another object of my invention is to provide a coin selector, or fraud preventive device which is adapted to be operated in connection with any coin controlled apparatus in which means are provided making it absolutely impossible for the vending machine or coin controlled machine to be operated twice on the deposit of one coin, as I provide means for automatically locking the machine against the second operation until a new coin is deposited therein.

Another object of my invention is to provide a fraud preventive device into which a plurality of coins may be deposited at one time, said device being so constructed as to permit only one coin at a time to enter the selected mechanism so that it is possible for an operator to drop in a plurality of coins, and operate the machine a plurality of times without depositing other coins until the coins have been exhausted, means being provided for delivering one coin at a time to the selecting mechanism, and holding in reserve the other coins until the coin which has entered the selecting mechanism has been disposed of by said selecting mechanism.

This fraud preventive device, as stated above, is adapted to be operated with any coin controlled mechanism, but is especially adapted to be used in connection with the vending machines disclosed in my patent applications, Serial Number 321,582 filed November 24, 1928; Serial Number 309,103 filed September 28, 1928; and Serial Number 340,718, filed February 8, 1929. The operation of said machines consists primarily of a shaft adapted to be turned a partial revolution to operate the mechanism for delivering a ribbon of bags through the machine, and for severing one of the bags from the machine. In this application I show a shaft adapted to be rotated a partial revolution, but it is evident that in cases where a shaft must be rotated a complete revolution or several revolutions that suitable gearing can be connected to the mechanism herein shown to impart the proper rotation or reciprocation or movement to a suitable vending mechanism.

Some of the objects of my invention having been stated, other objects will appear as the description proceeds, when taken in connection with the accompanying drawings, in which—

Figure 4 is a view similar to Figure 2 but showing the position of parts after a suitable coin has been dropped therein, and taken along the line 2—2 in Figure 7.

Figure 5 is a perspective view of the block in which my mechanism is mounted with the moving parts removed;

Figure 6 is a perspective view of the opposite side of the block or the side shown in Figures 2 and 4 with the parts removed;

Figure 7 is a vertical cross-sectional view taken along the line 7—7 in Figure 4;

Figure 8 is a side elevation partially in cross-section showing my balancing mechanism with a coin of proper weight therein;

Figure 9 is a view similar to Figure 8 but showing the position of parts with a slug which is lighter than a genuine coin placed therein;

Figure 10 is a view similar to Figures 8 and 9, but showing a slug therein which is heavier than a genuine coin;

Figure 11 is an end view taken along the line 11—11 in Figure 8;

Figure 12 is a cross-sectional view taken along the line 12—12 in Figure 8;

Figure 13 is a cross-sectional view taken along the line 13—13 in Figure 8, but with the coin omitted;

Figure 14 is a perspective view with parts broken away of the structure shown in Figures 8, 9 and 10;

Figure 15 is a view taken along the line 8—8 in Figure 11 along which line Figures 8 to 10 are taken, but in Figure 15 I show a different means of balancing the mechanism;

Figure 16 is a perspective view of the middle portion of the modified form of balancing means shown in Figure 15;

Figure 20 is a perspective view of inside of cover member 15.

Figure 21 is a perspective view of the entrance for the coin.

Figure 1:
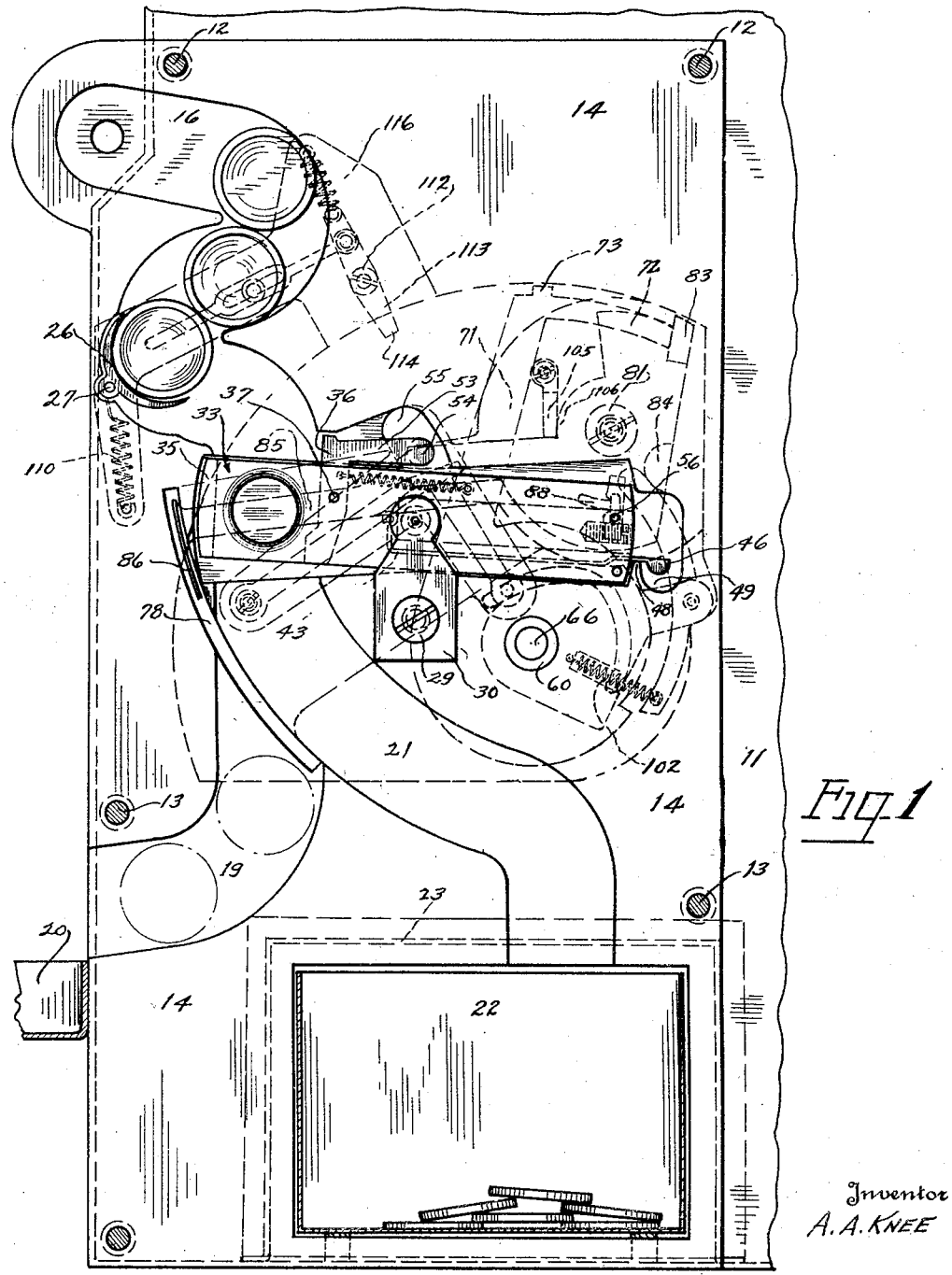
Figure 1 is a side elevation of my device with the cover portion removed showing one side thereof, and especially the balancing mechanism.

Referring more particularly to the drawings the numeral 10 indicates, the casing of a vending machine as illustrated in my above referred to co-pending patent applications, and the side wall portion of this vending machine is indicated by the reference character 11, as shown in Figure 7 of the drawings. My coin selecting mechanism is adapted to be secured to the side of a vending machine or any other suitable support by means of the screws 12 and 13, which penetrate the side wall portion 11 and are secured into the block 14, which block is adapted to have mounted therein my coin selecting mechanism which I shall describe at length hereafter.

The side wall portion 11 closes one side of the block, and the outer portion which is indicated by the reference character 15 closes the other side of the block, these forming the two lid portions for the block to cover the mechanism and to assist in holding it in position, and also to assist in completing the passageway for the coins as will be presently described.

Figure 3:
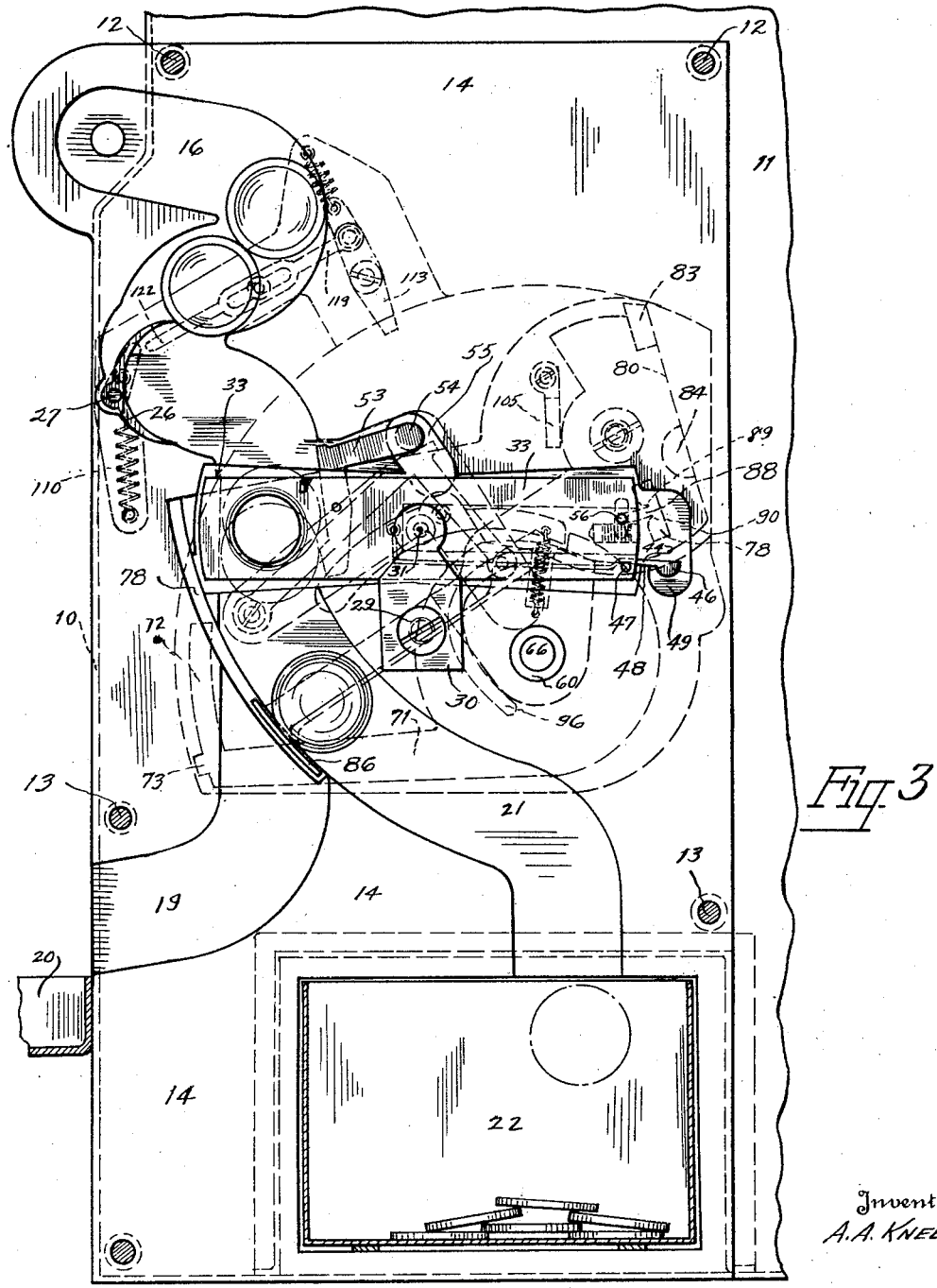
Figure 3 is a view similar to Figure 1, but showing the mechanism after a suitable coin has been dropped therein.
Figure 17:
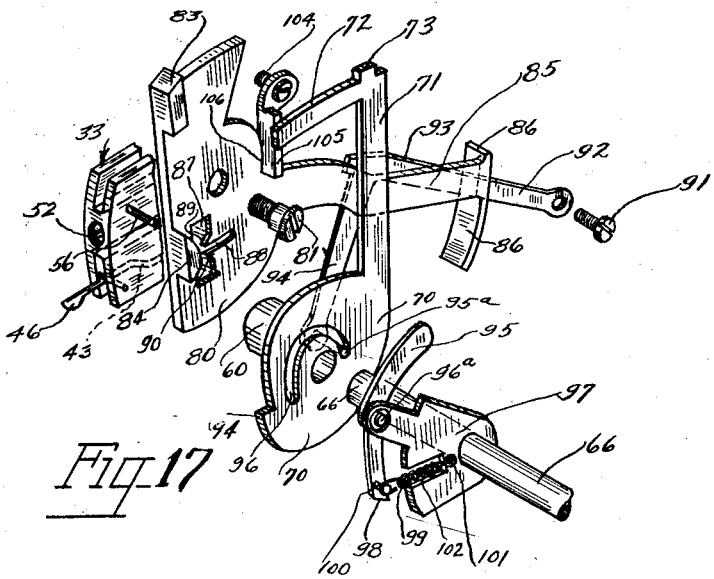
Figure 17 is a perspective of an exploded view of a portion of the parts appearing on both sides of the block.
Figures 18, 19:
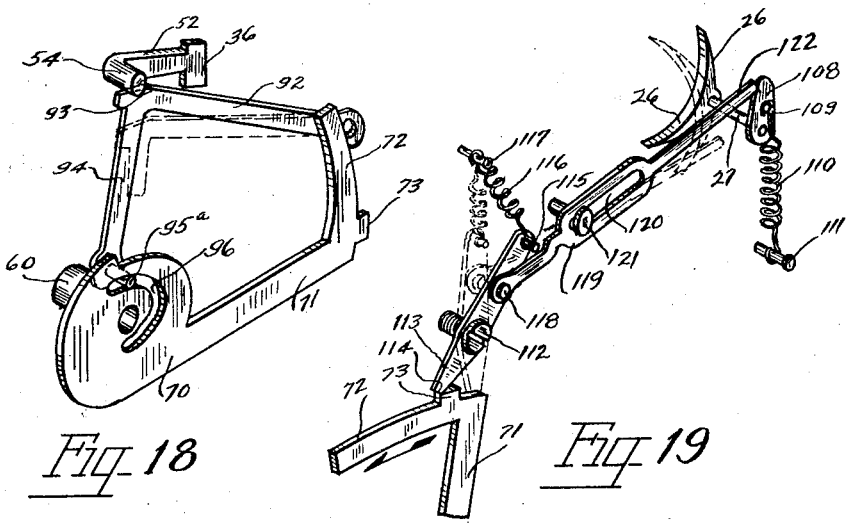
Figure 18 is a perspective view of a portion of my device as it appears in looking at Figure 4.
Figure 19 is a perspective view of the means for delivering coins one at a time to the balancing mechanism.

The cover portion 15 has certain cut-away or milled-out portions which are adapted to fit over certain parts which are secured in the block 14, and which will be presently described. Referring to Figures 1, 3, and 5 it will be seen that I have provided the slot 16 through which the coins are adapted to be inserted into the mechanism, which slot 16 leads in a circuitous manner downwardly to the transversely disposed cavity 17 in which my balancing lever is adapted to be mounted and below one end of this balancing lever which will later be described, the groove 18 is present, which groove forks immediately after leaving the transversely disposed groove 17 and the groove 19 is adapted to return rejected coins outwardly to the cup 20 on the outside of the device, and the groove 21 is adapted to direct genuine coins into a cash box 22 in the present instance or in cases where this device is desired to be used with other coin controlled apparatus, this groove 21 will direct the genuine coins into the vending mechanism whereby the coin may operate any suitable vending mechanism.

In Figure 7 I have shown the cash box 22 surrounded by the casing 23 on the interior of the machine, and this cash box 22 penetrates the block 14 through the hole 24, and also the side wall portion 11 and the cover 15 to the outside of the block in which my mechanism is mounted, and a suitable lock which is not shown can be placed on this cash box to prevent it being opened except by authorized persons.

I shall now proceed to describe the outside portion of the block and my mechanism which is contained on this outside portion. In the groove 16 we see the crescent-shaped member 26 which is fixedly secured to the pin 27 which is pivotally mounted in the block, said pin extending to the other side where mechanism is attached thereto which will be later described in cooperation with the mechanism of the other side of the block. This crescent-shaped member is adapted to control the passage of coins through this groove 16 to permit only one coin at a time to go therethrough until after the coin selecting mechanism has been operated, at which time another coin is permitted to pass by this member 26.

Secured to the block by means of the set screw 29 is the block 30 which has the pin 31 in the upper end thereof, which pin is adapted to penetrate the hole 32 in the balancing lever 33 to pivotally mount the same. A portion 34a is milled out in the cover portion 15 to fit over this portion 30 so as to allow the cover portion 15 to fit flush against the face of block 14. This balancing lever 33 has the slot 34 in one end thereof, which is adapted to receive the coin as it falls from the groove 16 after it has passed the stop member 26. One end of this slot 34 has the solid wall portion 35 and the other end of this slot 34 which is adapted to receive the coin is a resilient member 36, which is pivotally secured on the pin 37, which is transversely mounted in the balancing lever 33, and the lower end of this member 36 projects inwardly as at 38 to form a restricted portion in said slot against which the coin will lodge when it is dropped into the slot. The coiled tension spring 39 is secured in the hole 40 in the member 36, and the other end of this coiled tension spring 39 is secured to the pin 41 mounted in the lever 33. The coiled spring which has just been described is mounted in a slot indicated by the reference character 42, which is cut longitudinally of the balancing lever, and on the lower side of this balancing lever 33 is a similar longitudinally disposed slot 43 in which my stabilizing means are adapted to operate. This stabilizing means comprising the elongated member 44 which is pivotally secured on the pin 45 and projects downwardly, and then to the right in Figures 8, 9 and 10 in the said slot 43, and projects outward beyond the end of the balancing lever and has the weighted portion 46, and a pin 47 projects through the balancing lever 33, and this member 44 which is pivoted at 45 is adapted to rest on the pin 47 at certain times in the operation of the machine. It might be stated that this pin 47 is adapted to support the stabilizer 44 only when a coin or other device which is too heavy has been dropped into the slot 34 and this will cause the pin 47 to lift the stabilizer 44 off of the projection 48 which projection 48 is a portion of the block 14 with the milled-out hollow portion 49 in which the portion 46 is adapted to operate.

The solid portion 50 of the balancing beam or lever 33 is not milled-out but is continuous with the side portions, and in this solid portion is the hole 51 which has interior threads therein, in which the set screw 52 is adapted to be adjusted to regulate the balancing of the lever 33. The member 36 has the laterally projecting portion 53 which has the portion 54 which projects through the hole 55, which goes entirely through the block and this pin 54 is adapted to co-operate with the mechanism on the other of the block which will be presently described.

The pin 56 is secured in the balancing lever 33 in close proximity to the screw 52, and this projects through the slot 57 to the other side of the block where it co-operates with mechanism which will be later described. The portion 54 which is not only adapted to operate with mechanism on the other side of the block as above stated, is also adapted to limit the downward movement of the portion 53 of the member 36 as this pin 54 strikes against the upper edge of the balancing lever 33, and is held there in normal position by the tension of spring 39, thus preventing the portion 38 of the member 36 from moving further to the left in Figure 10.

In Figures 15 and 16 I have shown the balancing lever as above described with the exception that the stabilizer 44 and the pin 45 and the weight 46, and the pin 47 are omitted, and instead of this arrangement I provide the member 30a which is adapted to take the place of member 30, and this member 30a has the two pins 31a and 31b secured in the upper end thereof, which pins are adapted to project into the horizontally disposed slot 32a which slot has the two notches in either end thereof, in which these pins 31a, 31b are adapted to fit, and support the lever, the operation being that when a coin which is too heavy is dropped into the mechanism the lever will be supported by the pin 31a and when the lever is in normal position without any coin therein at all, it will be supported in normal position by the pin 31b and when a coin of proper weight is dropped into this structure as shown in Figures 15 and 16, it will cause the pin 31a to move into position to engage its pivot point slightly so that the lever will be supported when a coin of the proper weight is dropped therein by both of the pins 31a and 31b, this taking the place of the stabilizer lever 44 and associated parts as above described. The drawings in Figure 15 show the position of this modified form when a genuine coin is dropped into this mechanism. It might be stated that a coin which is of lighter weight than a genuine coin with which this device is adjusted to be operated is dropped into the machine that the lever will still balance on the pin 31b. The dotted line positions shown in Figure 15 shows the position that the balancing lever will take when a coin of too light weight is dropped therein, and also when a coin of too heavy weight is dropped therein. It might here be stated in Figures 8, 9 and 10 that Figure 8 shows the position of the balancing lever when a coin of proper weight is dropped therein, while Figure 9 shows the position of parts when a coin of too light weight or a slug of too light weight is dropped therein, and Figure 10 shows the position of parts when a slug which is heavier than a genuine coin has been dropped therein.

The hole 32 may be in the lever 33 if desired but in the drawings I have shown the bushing 58 therethrough in which the hole 32 appears, the bushing 58 having portions extending beyond the side walls of the balancing beam 33 so as to prevent the side walls from coming in contact with the block and cover 15 attached to one side of the block.

The block 14 has the hole 59 therethrough in which the hollow shaft 60 is loosely mounted, and on the outer end of this shaft 60 is mounted the crank arm 61, it being understood that any means may be secured on this shaft 60 for operating the same whether it be a crank arm or motive power, or any other means desired. This crank is secured on the shaft 60 by means of the set screw 62 or any other suitable means. The hollow shaft 60 has mounted therearound the coiled spring 63 which pierces a hole as at 64 in the crank arm and is coiled around the hollow shaft 60, and is secured to the cover 15 as at 65, the purpose of this spring being to return the parts to normal position after the device has been operated. This shaft 60 is mounted on the solid shaft 66, which shaft 66 is adapted to operate a vending mechanism as set forth in the above referred to patent applications, or in fact any coin controlled apparatus may be operated by this shaft 66. The shaft 66 and the hollow shaft 60 are adapted to be locked together for unitary rotation by means of the mechanism which will be presently described.

Having described one side of the block I shall now proceed to describe the mechanism located on the other side of the block, or the side next to the wall of the vending machine indicated by the reference character 11.

Figure 2:
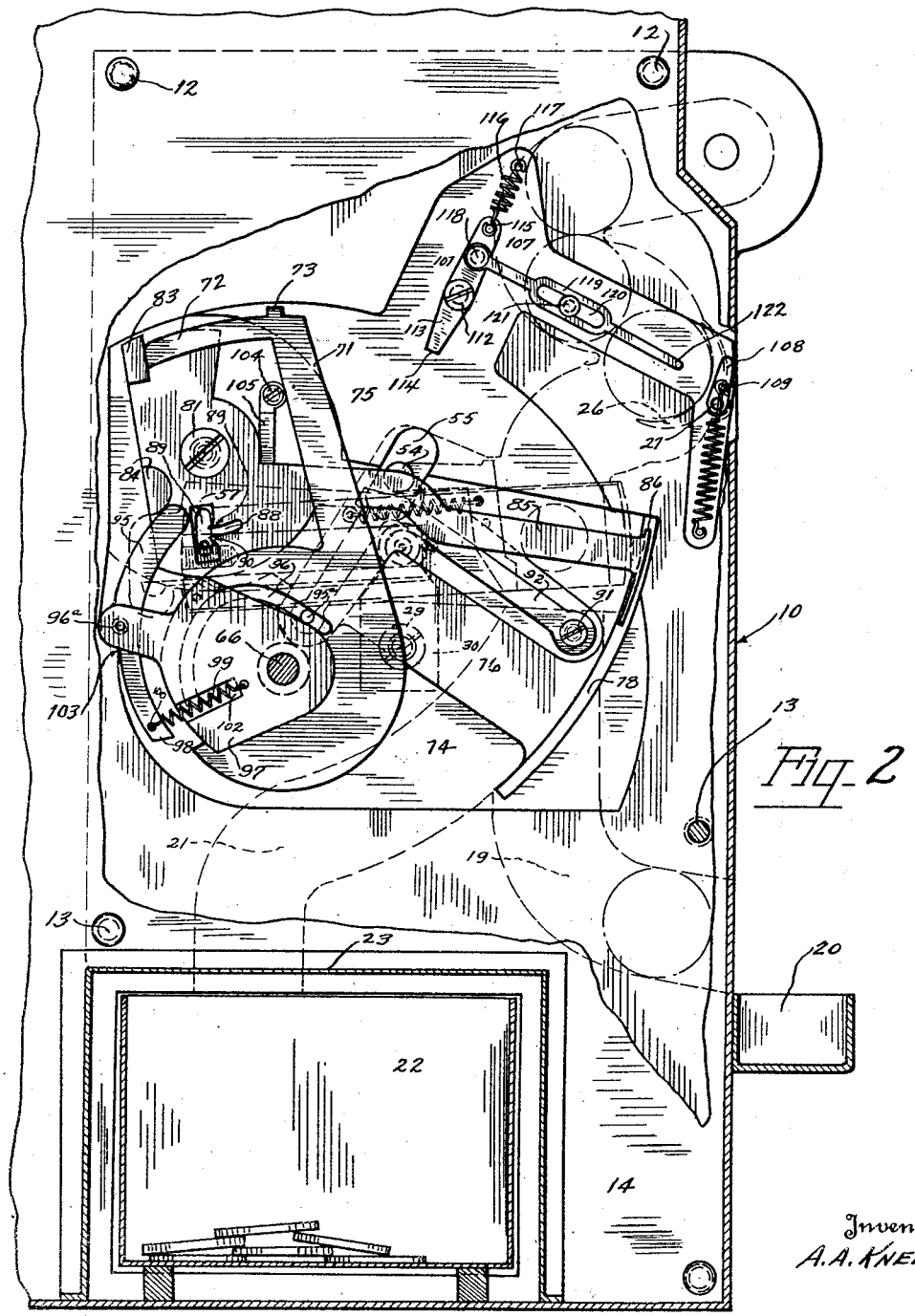
Figure 2 is a side elevation of the opposite side from that shown in Figure 1, taken partly in section along the line 2—2 in Figure 7.

Integral with the hollow shaft 60 is the member 70 which has the arm 71 projecting therefrom, with the arc shaped member 72 projecting from the end of said arm with the lip 73 at the junction point of the portions 71 and 72, the purpose of which lip will be later described. This member 71 and the portion 70 and associated parts operate in a milled-out cavity in the side of the block, and in order to more clearly describe the mechanism on this side of the block, I shall state the way in which this side of the block is milled out. I first mill out the block to provide the surfaces 74 and 75, and on this milled-out surface namely, 74 and 75 which surfaces are in the same plane, I mill out a deeper surface 76 and in this deeper surface 76 I mill out the additional deeper surface 77 in which my parts are adapted to work. Cut into the surface 74 is the hole 59 which has previously been described, and in which the hollow shaft 60 is adapted to operate and against this surface 74 the member 70 which has just been described is adapted to operate. The hole 55 is cut into the surface 77 and extends entirely through the block, said hole having already been described. The hole 57 also appears in Figure 6 it being previously described, and is cut in the deeper surface 76. The curved slot 78 which appears on both sides of the block, being cut therethrough is cut in the surface 76 and also in the surface 74 and through this slot the coin director is adapted to project and to operate. This coin director comprises the member 80 pivotally secured on the screw 81 which fits into the threaded hole 82. This member 80 has the comparatively straight rear portion with the projections 83 and 84 thereon projecting outwardly from its plane surface and it has the arm 85 projecting therefrom with the laterally projecting portion 86 which is in the form of an arc of a circle, and this portion 86 is adapted to project through the slot 78 and to appear in the slot 19 or rather at the junction point of the slots 18 and 19 when the parts are in one position to deflect the coin after it is released from the balancing mechanism into the slot or channel 121. Normally this portion 86 will remain in the upper end of the slot as shown in Figures 1, and 2. The member 80 has the vertically disposed slot 87 therein with the laterally projecting slot 88 which projects from the right hand thereof in Figure 4, and the lips 89 and 90 on either side of the mouth of the slot, the purposes of these lips being to prevent the pin 56 from entering this slot 88 or sliding therein from the sides but compels the pin 56 to enter directly into said slot, when the parts are in perfectly balanced position with a proper coin therein as will be later described.

Pivotally mounted on the screw 91 in the deepest milled out surface 77 is the lever 92 which projects upwardly and backwardly, and has the cam surface 93 thereon with the downwardly projecting leg 94 which downwardly projecting leg has the pin 95a therein which is adapted to work in a circuitous slot 96 in the portion 70. The portion 93 is adapted to push upwardly on the projection 54 to release the coin in the balancing lever when the machine is operated, or when the coin selecting mechanism is operated.

The member 70 has the off-set portion 94 thereon which is adapted to cooperate with the pivoted member 95 which is pivoted as at 96a on the member 97 which is fixedly secured on the solid shaft 66. The lower end of this member 95 is designated by the reference character 98 and has the point which is adapted to engage the portion 94 on the member 70 to lock the members 97 and 70 together for rotation in one direction, and thus permit the vending mechanism driven by the shaft 66 to be operated. This member 95 has the coiled tension spring 99 secured to the pin 100 on the lower end of the member 95 and the other end of said spring is secured to the member 97 as at 101, said spring fitting in the slot 102 which is cut in the member 97. It is evident that my coin selecting mechanism will operate without the solid shaft 66 and associated parts 95 to 102, but it is necessary to have these parts when it is desired to drive a vending mechanism in cooperation with the coin selecting mechanism. When the parts are in normal position the portion of 97 which projects backwardly and upwardly is adapted to rest on the ledge 103 of the block and this will cause the upper end of lever 95 to rest against the projection 84 on the member 80 and this will cause the lower end of the lever 95 to be disengaged from the ledge 94 on the member 70 and thus unlock the coin selecting mechanism from the vending mechanism, when the parts have been returned to normal position. The end of lever 71 which is indicated by the reference character 72 is adapted to press against the projection 83 on the member 80 to raise this portion to the position shown in Figure 2, and thus raise the coin deflecting portion 86 to its upper position ready for a coin to be inserted to balance the balancing mechanism, and when the coin is dropped into the machine and the mechanism is balanced and the crank is pulled it will mean that the pin 56 shall be in alinement with the slot 88 and this will allow the arm 85 to fall and the portion 80 to rotate therewith, and will cause the coin deflecting portion 86 to assume the position shown in Figures 3 and 4 and thus close the slot 19 and prevent the coin from being returned to the operator of the machine, but will deflect the coin into the channel 21 where it will go to operate a mechanism which is controlled by a coin, or in the present instance will be deposited in a cash box as the vending mechanism is tied up with the coin selecting mechanism as above described. The above operation of course is predicated on the assumption that when the parts are operated as above set forth a coin of genuine denomination and of the proper weight will have been deposited on the balancing lever, which has heretofore been described.

The pin 104 is secured in the upper portion of the milled-out portion 76 and on this pin 104 is mounted the member 105, the purpose of this member being to trip the lever 95 before the crank is let all the way back to normal position, and to allow the lever 95 to pass by this without interfering with the lever 95 in any way as the crank is pulled to operate the device, but as the crank is let back this member 105 rests against the portion 106 as the lever 95 goes back to normal position, and this trips this lever from engagement with the ledge 94 to prevent the machine from being operated the second time on the deposit of one genuine coin.

The coiled spring 63 tends to force the crank arm 61 and associated parts back to normal position, and this causes the portion 72 of the lever 71 to press against the projection 83 on the member 80, and hold the coin director 86 in the upper end of the slot, and the projection 84 presses against the upper end of lever 95 and the tension spring 99 secured to the lower end of this lever presses the lever 95 against this projection 84 so that when the coin is dropped in the machine and it being a genuine coin in the balancing mechanism causes the slot 88 to coincide with the pin 56 in the balancing mechanism, and then when the crank arm 61 is pulled slightly forward the tension of spring 99 pressing against the projection 84 will thereby force the member 80 to turn and force the lever 85 and the coin director 86 downwardly to assume quickly the lower position to block the passageway to slot 19 for the return of the coin to the operator, and it being a genuine coin will direct it into the passageway 21 as above described.

The surface 75 is extending upwardly and forms the portion 107 in which are means for operating the crescent shaped member 26. This crescent shaped member has the pin 27 extending through the block as previously described, and on this pin is fixedly secured the lever 108 and between the pin 27 and the end of this lever is secured the pin 109 to which is secured one end of the tension spring 110 the lower end of this tension spring being secured to the pin 111, it being evident that this presents an off-center effect so that this spring has a tendency to hold the crescent shaped member 26 in either of its two positions until compelled by other means to change that position. The pin 112 is secured in the surface 107 and on this pin 112 is mounted the lever 113 which has the downwardly projecting portion 114 which projects into the path of the projection 73 to cause the projection 73 on the arm 71 to trip the same. The upper end of this lever 113 has the pin 115 therein, to which is connected the tension spring 116, the other end of this spring being secured to the pin 117, it being evident that this arrangement has a tendency to hold the parts in the position shown in Figure 4. Secured in a pivoted manner between the screw 112 and the pin 115 and on the pin 118 is the lever 119, which has the elongated slot 120 therein, in which the pin 121 is adapted to fit, said pin being screwed into the block. The lower end of the lever 119 is indicated by the reference character 122, and this portion 122 is adapted to strike the upper end of lever 108 and throw the crescent shaped member 26 to the position shown in Figure 1, when the crank handle 61 is allowed to return to normal position after having been pulled forwardly completely to operate the coin selecting mechanism and in the present instance to also operate the vending mechanism.

The solid shaft 66 has secured therearound the coiled spring 123 which has one end thereof secured to the portion 11 by means of the screw 124 and the other end of this coiled spring penetrates the solid shaft 66 as at 125, the purpose of this spring being, to return the member 97, the lever 95 and associated parts to normal position to cause the upper end of the member 97 to rest on the projection 103 as shown in Figure 2.

In Figure 20 I have already described the milled out portion 34a which is adapted to fit over the member 30 and this member 15 has the transversely milled out portion 126 which is adapted to fit over the balancing lever, and to be free from said balancing lever so as to prevent a binding effect on the said balancing lever. The portion 127 fits over the portion 53 so as to prevent a binding effect upon said lever, so that said lever can operate independently and freely at all times to release the coin from the balancing lever, and it might be here mentioned that the portion 54 of said lever which projects through the hole 55 is free from the path of the member 85 so that no binding effect is exerted on any portion of the balancing lever by any parts of the mechanism, and the only point that it touches the other points of the mechanism is at its pivot points which have been described heretofore, that is while the lever is being balanced, and before it is operated upon by the operation of the crank arm. The arc shaped portion 128 is cut out of the inside portion of member 15, the purpose of this arc shaped portion being to allow the coin deflector 86 to project into this portion 128, and therefore prevent the edge of this portion 86 from coming in contact with anything that might be dropped into the machine, it being evident that if this slot 128 was not present that thin pieces of tin and other devices which might be dropped in might lodge between the edge of member 86 and the cover portion 15, but by providing this slot the portion 86 is made broad enough to extend into this slot and therefore presents a smooth surface for the support and the deflection of the coin as it passes by the member 86. The member 15 has a plurality of holes therethrough, through which the rivets 12 and 13 project to secure the entire mechanism together. This member 15 also has the hole 129 through which hole 129 the hollow shaft 60 which supports the crank arm 61 is adapted to fit.

The method of operation of my device is as follows:

With the parts in normal position as shown in Figures 1 and 2 let us suppose that a plurality of coins are dropped into the coin receiving chute 16, the first coin dropped will travel downwardly and will hit the member 26 in the position shown in Figure 1 and will trip this member 26 to the position shown in Figure 3, and the first coin will pass downwardly and fall into the slot 34 and against the lower end of lever 36 and rest against the projection 38 and balance the lever in one of the three positions shown in Figures 8, 9 and 10. The remaining coins which are dropped in before the machine is operated will strike against the upper portion of the member 26 as shown in Figure 3, and will remain there until the crank arm 61 is pulled forwardly, and is allowed to return to normal position. When the crank arm is pulled forwardly the lever 71 which is integral with the crank arm 61 will travel to the right in Figure 2 to the position shown in Figure 4. This will release the portion 72 from the projection 83 and will release the member 80 and the arm 85, and the coin deflector 86. If a coin of proper weight has been dropped into the slot 34 in the balancing mechanism this slot 34 will assume a position shown in Figure 3, and this will cause the pin 56 to be opposite the slot 88, and this will allow the member 80 to partially rotate on its pivotal point 81, and will allow the coin deflector portion 86 to fall downwardly to assume the position shown in Figures 3 and 4, and the upper portion of lever 95 will hasten this operation, and by the swinging of the upper portion of lever 95 backwardly this will allow the lower end of lever 95 to engage the shoulder 94 on the member 70, and thus lock the members 80 and 70 together as the projection 84 will be moved out of engagement with the upper end of lever 95, and with the parts in the position as described the crank arm can be pulled entirely forward and the pin 95a which travels in slot 96 will force the member 94 upwardly and will cause the portion 93 to push the pin 54 upwardly, and this will swing the lever 36 on its pivot point 37 and will release the coin, and allow the same to drop downwardly, and the coin deflector 86 having closed the slot 19 will cause the coin to be deposited in the cash box or in case of it being applied to a vending mechanism it can deliver the coin through the slot 21 to the proper vending mechanism, as the above described operation is that of the machine when a genuine coin has been deposited therein. As the member 71 is moved its entire distance to the end of its travel the coiled spring 63 will cause the parts to return to normal position, and on the return trip of the member 71 the projection 73 will strike the lower end 114 of lever 113 and this will push the member 119 forward to cause the end thereof 122 to engage the upper end of the lever 108 and will turn the crescent shaped member 26 back to the position shown in Figure 1, and this will allow another coin to drop through into the balancing mechanism, and the passage of this coin will cause the member 26 to assume the position shown in Figure 3. The remaining coins above the member 73 of course will be retained by the crescent shaped member 26 being in the position just described, and this operation will be repeated until all of the coins stored in the groove 16 are delivered to the balancing mechanism.

After the projection 73 passes the lower end of lever 113 the parts move further backward, and were it not for the member 105 it would be possible for anyone desiring to do so to operate the machine again and secure goods as it would again rotate the shaft 66 due to the fact that shafts 60 and 66 are locked together by means of the lever 95 being in engagement with the ledge 94 on the member 70, but on the backward movement of the parts the upper end of lever 95 strikes the lower end of the pivoted member 105, which is resting against the member 80 and this trips the lower end of lever 95 from engagement with the ledge 94, and thus unlocks the coin selecting mechanism from the vending mechanism operated by the shaft 66, and prevents the machine being operated again to cause the same to deliver any goods. In this reverse motion the slot 96 working on the pin 95a will allow the pin 54 to move downwardly again and this will allow the portion 38 of lever 36 to assume its initial position so that another coin will not pass therethrough, but will lodge in the balancing mechanism.

When a coin or slug which is lighter than the genuine coin for which the device is adjusted, is dropped into the machine, or into the balancing mechanism it will not raise the back end of the balancing mechanism high enough to allow the pin 56 to register with the slot 88 and this will not allow the coin deflector 86 to move downwardly, and then when the crank arm is pulled the vending mechanism will not be locked to the crank arm, and the coin will drop downwardly, being released from the balancing mechanism, and the coin deflector not being allowed to drop will cause the slot 19 to be open and the undesirable coin or slug will be returned to the cup 20, and will not operate the machine. This state of operation will always occur when the coin or slug which is dropped into the machine is lighter than a genuine coin for which the device is adjusted to operate with.

When a coin or slug is dropped into the machine and enters the balancing mechanism, with said coin or slug or other device being heavier than the coin for which this machine is adjusted to operate with, this will depress the left hand end of the lever as shown in Figure 1 to a greater position than would happen with a genuine coin, and when this state of affairs exists the slot 88 in the member 80 will not register with the pin 56 because the pin 56 will be raised too high and will be above the slot 88, so that when the portion 72 is withdrawn from against the projection 83 the pin 56 will not enter the slot 88, and therefore the coin deflector 86 will not fall and the coin will be rejected in the same manner as a light coin.

The reason for this critical handling of coins and causing the machine to receive only genuine coins is due to the stabilizing mechanism which I have heretofore described, and attention is directed to Figures 8, 9 and 10. When a coin which is too light such as a slug or a token or any object which will enter the machine which is lighter than the genuine coin for which the machine is adjusted the balancing lever 33 will assume the position shown in Figure 9, and there it is evident that the pin 56 will not be raised high enough to coincide with the slot 88, and when the coin or slug is released it will be returned to the operator. In this case the stabilizer 44 and associated parts will not be brought into operation and will remain resting on the ledge 48. Now referring to Figure 8 it is there seen that the parts are shown as being in the position which they will assume when a genuine coin for which the device is adjusted to operate is dropped therein, in which instance the pin 47 will be moved upwardly with the entire end of the balancing mechanism in which it is mounted, and will engage the stabilizer 44 and due to the weight 46 on the end thereof will suddenly stop the upward movement of pin 47, and cause the entire balancing mechanism to quickly assume a balanced and stationary position, and which will cause the pin 56 to be in alinement with the slot 88 and cause the machine to operate perfectly.

When a coin or slug or other device which is heavier than the genuine coin for which the device is adjusted to operate is dropped into the machine, the balancing mechanism will assume a position similar to that shown in Figure 10 and in which instance the pin 47 will engage the stabilizer 44, and if the coin is of any increased weight over that of a genuine coin it will entirely raise the stabilizer weight 46 and the stabilizer 44 from the projection 48, and this also causes the balancing mechanism to quickly assume a stable position with the pin 56 located at a point above the slot 88, and this will also cause the coin to be rejected because of the lack of the pin 56 and the slot 88 coinciding with each other will cause the coin deflector 86 to fail to operate, but will remain in elevated position when the crank arm is pulled forwardly and this will cause the heavy coin to also be rejected as well as a light coin or slug.

It is thus seen that I have provided a coin selector or fraud preventive device which will pass to a selected position only coins which are genuine, and which comply with the adjustment of the fraud preventive device, and which will deliver to the vending machine for operation of the vending machine only genuine coins, and will return to the operator of the machine coins which are not genuine, such as slugs, tokens and other non-genuine articles which may be placed within the machine.

I have described this machine without naming any particular coin to be used in connection therewith, as it is evident that this device may be used in connection with any coin of any desired denomination provided the same is built to handle this particular coin and is adjusted to comply with the requirements demanded by any particular coin, as to weight.

It is evident that this machine may be used in relation to turn-stile and other mechanism which is operated by tokens instead of genuine coins as the machine can be adjusted to handle tokens of any denomination in the same manner as it would handle a coin of a given denomination if adjusted or manufactured to handle such a coin.

The terms "check" and "coin" are used interchangeably to denote any coin, token, check or other body for insertion into the device.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a fraud preventive device for vending machines, a balancing mechanism, stabilizing means for said balancing mechanism a passageway leading to the balancing mechanism from the exterior of the machine, two passageways leading from the balancing mechanism, one of the last two passageways leading to the exterior of the machine, and the other passageway leading to an interior point on the machine, movable means controlled by the balancing mechanism for deflecting a coin into the machine when of proper weight, and for returning the coin to the exterior of the machine when the coin is below or above the weight of a genuine coin, said stabilizing means having a support therefor independent of the balancing mechanism and means in the balancing mechanism normally out of contact with the stabilizing means and being adapted to engage and move said stabilizing means when said balancing mechanism is moved a predetermined amount by a check deposited therein.

2. In a fraud preventive device for check-controlled apparatus, a balancing mechanism and stabilizing means therefor, means in said balancing mechanism for receiving a coin, movable means controlled by said balancing mechanism for diverting the coin into one channel if the same is genuine and to divert the coin into another channel if the same is below or above the weight of a genuine coin, said stabilizing means having a support therefor independent of the balancing mechanism and means in the balancing mechanism normally out of contact with the stabilizing means and being adapted to engage and move said stabilizing means when said balancing mechanism is moved a predetermined amount by a check deposited therein.

3. In a coin selector adapted to deliver coins to a vending apparatus, a balancing lever, stabilizing means for the balancing lever, movable means associated with and controlled by said balancing lever for diverting the coin into one channel if the same is of proper weight, and to divert the coin into another channel if it is below or above the weight of a genuine coin, said stabilizing means having a support therefor independent of the balancing mechanism and means in the balancing mechanism normally out of contact with the stabilizing means and being adapted to engage and move said stabilizing means when said balancing mechanism is moved a predetermined amount by a check deposited therein.

4. In a coin selector and fraud preventive device for check-controlled apparatus, a balancing lever, stabilizing means for said balancing lever, means for guiding a coin from the exterior of the machine downwardly to the balancing lever, said device having a groove leading from below the balancing lever to one portion of the machine and also having a groove leading from below the balancing lever to the exterior of the machine, and movable means controlled by said balancing lever for diverting the coin into one groove if the coin is of a given weight, and for returning the coin to the exterior of the machine if it is under or above a given weight, said stabilizing means having a support therefor independent of the balancing mechanism and means in the balancing mechanism normally out of contact with the stabilizing means and being adapted to engage and move said stabilizing means when said balancing mechanism is moved a predetermined amount by a check deposited therein.

5. In a coin selector for coin controlled mechanism, a balanced member pivoted intermediate its ends to assume a swinging position, means for directing a coin to said balanced member, means for holding the coin in said balanced member, means separated from but controlled by said balanced member to deflect coins of a given weight in one direction and to deflect coins below or above a given weight in another direction.

6. In a coin controlled mechanism, a fraud preventive device, said fraud preventive device comprising a balancing member pivoted intermediate its ends and being adapted to receive a coin, stabilizing means for said balancing member, means for conveying the coin to the balancing member, and means controlled by the balancing member for directing the coin into one channel if of a given weight, and for directing the coin into another channel if not of a given weight, means for supporting at least a portion of said stabilizing means independently of the balancing member, means on the balancing member for holding said stabilizing means off its support when a coin above a given weight is received into said balancing mechanism.

7. In a fraud preventive device, a block member, having a coin receiving channel adapted to convey a coin through the block member, a balancing mechanism mounted in association with said channel, means on the balancing mechanism penetrating the block member, means on the other side of the block member adapted to be controlled by the balancing mechanism to regulate the position of a deflecting member, said deflecting member being adapted to penetrate a slot in the block member to divert coins into a proper channel, and means associated with the said parts adapted to allow the diverting member to fall into diverting position when the coin is of proper weight, and means for preventing the diverting member from assuming the deflecting position when the coin is not of proper weight.

8. In a coin controlled mechanism, a fraud preventive device, said fraud preventive device comprising a block member having a circuitous groove leading along one side thereof, a cover for said block member, a balancing mechanism associated with said groove, said block member having a hole therein, a pin in one end of said balancing mechanism, said pin penetrating said hole, said block member having a slot therein, a pivoted member on the opposite side of the block member from the balancing mechanism, said pivoted member having a slot therein, a deflecting portion on said pivoted member adapted to penetrate said slot, said balancing mechanism and the pin thereon being adapted to hold the pivoted member in elevated position when the coin is not of proper weight, and being adapted to allow the pivoted member to fall to deflect the coin into a vending mechanism when the coin is of proper weight.

9. In a coin controlled apparatus, a fraud preventive device, said fraud preventive device comprising a balancing mechanism, a channel adapted to convey coins to the balancing mechanism, a deflector member adapted to operate in conjunction with said channel, means co-operating between the deflecting member and the balancing mechanism to cause the deflecting position when the coin is of a given weight and to assume another position if a coin is below or above a given weight, a stabilizer for said balancing mechanism, a support for the stabilizer and means in the balancing mechanism for raising said stabilizer off its support when a coin above a given weight is inserted in the balancing mechanism.

10. In a coin controlled mechanism, a fraud preventive device having a forked passageway for a coin, a deflecting member adapted to operate in one of said passageways, a balancing mechanism, and means on the balancing mechanism and the deflecting means adapted to cooperate to divert a coin from the balancing mechanism into one portion of the forked passageway if of the proper weight and being adapted to deflect the coin into another channel if not of the proper weight.

11. In a fraud preventive device, means for conveying a coin through the device, a balancing mechanism adapted to receive the coin and weigh the same, stabilizing means for said balancing mechanism, means associated with said balancing mechanism and controlled thereby adapted to assume a position to allow the coin to enter a vending mechanism and to operate the same if of the proper weight, said means being adapted to return the coin to the exterior of the device if below or above the proper weight without operating the vending machine, a support for supporting at least a major portion of the weight of said stabilizer independent of the balancing mechanism and means in said balancing mechanism for raising said stabilizer off its support when a coin above a given weight is inserted into the balancing mechanism.

12. In a fraud preventive device adapted to select coins and deliver genuine coins only to a vending apparatus, a balancing mechanism, stabilizing means for said balancing mechanism, means controlled by said balancing mechanism for determining the path a coin shall travel through the fraud preventive device, said means being adapted to deliver genuine coins of a given denomination to the vending machine and being adapted to return all coins not conforming to the given weight to the exterior of the fraud preventive device, means independently of the balancing mechanism for supporting at least a part of said stabilizing means, and means on the balancing mechanism for engaging said stabilizing means to raise the stabilizer off its support when a coin is received into said balancing mechanism.

13. In a fraud preventive device, a balancing mechanism, said device having a coin chute adapted to deliver coins to said balancing mechanism, stabilizing means for said balancing mechanism adapted to cause said balancing mechanism to quickly assume a position of rest after receiving the coin, means associated with said balancing mechanism for determining the path of the coin after it leaves the balancing mechanism, additional means for releasing the coin from the balancing mechanism, means for supporting at least a major portion of the weight of said stabilizing means independently of the balancing mechanism and means on the balancing mechanism for engaging the stabilizer and removing it from its support when a coin in the balancing mechanism is above a given weight.

14. In a fraud preventive device, a coin selecting means, a stabilizing device adapted to stabilize the coin selecting means, a coin chute leading through said coin selecting means, means in the coin chute adapted to deliver one coin at a time to the coin selecting means, said last means being adapted to be operated by the operation of the coin selecting means.

15. In a fraud preventive device, a pivoted member, a coin receiving portion in said pivoted member, a stabilizer in said pivoted member adapted to stabilize the said pivoted member after it receives the coin, means for adjusting said pivoted member to receive coins of a given value, means controlled by said pivoted member for determining the path to be traveled by the coin after being released from the pivoted member, and means for releasing the coin from the pivoted member.

16. In a fraud preventive device and coin selecting mechanism, a pivoted member, means for conducting a coin through said pivoted member, stabilizing means associated with said pivoted member, a pin mounted on one end of said pivoted member, a second pivoted member, a slot in said pivoted member, a coin deflector on said second pivoted member, said slot and said pin being adapted to register to allow the coin deflector to assume a given position when a coin of a given weight is dropped into the pivoted member, and being adapted to prevent the coin deflector from assuming the given position when the coin is not of a given weight.

17. In a coin selecting mechanism adapted to be operated with a vending machine, a coin selecting device, said coin selecting device comprising a balancing mechanism and stabilizing means therefor, means for operating a vending machine associated with said coin selecting device, said vending means being adapted to be automatically connected to the coin selecting mechanism when the coin dropped therein is of a given weight, and being adapted to fail to connect the vending mechanism when the coin is above or below a given weight.

18. In a coin selecting mechanism for a vending apparatus, means for determining the weight of a coin, means for connecting the coin selecting mechanism with the vending mechanism when the coin is of a given weight, said coin selecting means being adapted to be disconnected from the vending means before the parts reach a normal position after being operated.

19. In a fraud preventive device, a member pivoted intermediate its ends and being adapted to receive coins at one end, a coin chute for delivering the coins to said mechanism, means associated with the other end of said member adapted to quickly stabilize said member when a coin is dropped therein, pivoted means for deflecting the coin into one portion of the machine when it is genuine, said pivoted means being controlled by the pivoted member, said means being adapted to return the coin to the exterior of the machine when it is not genuine.

20. In a check controlled apparatus, a check entrance, a passageway leading from said check entrance, a device in said passageway adapted to permit one check to pass at a time, a balancing mechanism at the other end of said passageway and having means in one end thereof to receive and hold a check, a forked passageway below said balancing mechanism into which the check is adapted to be passed after leaving the balancing mechanism, a deflecting member adapted to be normally held in raised position, means for releasing said deflecting member for engagement with said balancing mechanism, said balancing mechanism being adapted to permit said deflecting member to move to direct the check into the proper channel if genuine, said deflecting means being adapted to remain inoperative if the check is not genuine, and a stabilizing device associated with the other end of said balancing mechanism adapted to become operative when a check is dropped into the other end of the balancing mechanism.

21. In a fraud preventive device for check controlled apparatus, a balancing mechanism having means in one end thereof for receiving and holding a check, stabilizing means in the other end of the balancing mechanism, a deflecting member associated with said balancing member and being adapted to be controlled by said balancing mechanism to deflect the check in one of the two directions after the same is released from the balancing mechanism.

22. In a fraud preventive device for check controlled apparatus, a balancing mechanism, means in one end of the balancing mechanism for receiving and holding a check, stabilizing means in the other end of said balancing mechanism, a deflecting member associated with the other end of said balancing mechanism and being adapted to be controlled thereby to deflect genuine checks into the check controlled apparatus, said deflecting member being adapted to remain inoperative when the check is not of a given weight.

23. In a fraud preventive device for check controlled apparatus, a balancing mechanism, means in one portion of the balancing mechanism for receiving and holding a check, stabilizing means in another portion of said balancing mechanism, a deflecting member associated with said balancing mechanism and being adapted to be controlled thereby to deflect checks into the check controlled apparatus if genuine and to remain inoperative when the check is not genuine, means apart from the balancing mechanism for supporting the stabilizing means, and from which support the stabilizing mechanism is lifted when a check above a given weight is inserted into the balancing mechanism.

24. In a fraud preventive device for check controlled apparatus, a balancing beam pivoted intermediate its ends and having means in one end thereof for receiving and holding a check, a stabilizer associated with said balancing beam and means apart from the beam for normally supporting the stabilizer, means in the beam for raising and holding the stabilizer off its support when a check is contained in the beam of a weight above that for which the machine is constructed, a deflector for the check, means for automatically releasing the check from the beam, and means operable by the position of the beam for controlling the deflector.

25. In a fraud preventive device for check controlled apparatus, a balancing mechanism pivoted intermediate its ends, means for guiding a check into one end of said balancing mechanism, a stabilizer operatively associated with the other end of said balancing mechanism, means independent of the balancing mechanism for supporting at least a major portion of the weight of the stabilizer normally free from the balancing mechanism and means in the balancing mechanism for engaging and moving the stabilizer when said balancing mechanism is moved by the reception of a check thereinto.

In testimony whereof I affix my signature.

AARON A. KNEE.